(12) United States Patent
Subbiah et al.

(10) Patent No.: US 9,375,656 B2
(45) Date of Patent: Jun. 28, 2016

(54) SLURRY OIL UPGRADING WHILE PRESERVING AROMATIC CONTENT

(71) Applicant: PHILLIPS 66 COMPANY, Houston, TX (US)

(72) Inventors: Ayyappan Subbiah, Bartlesville, OK (US); Tushar V. Choudhary, Bartlesville, OK (US)

(73) Assignee: PHILLIPS 66 COMPANY, Houston, TX (US)

( * ) Notice: Subject to any disclaimer, the term of this patent is extended or adjusted under 35 U.S.C. 154(b) by 0 days.

(21) Appl. No.: 14/308,802

(22) Filed: Jun. 19, 2014

(65) Prior Publication Data

US 2014/0299510 A1    Oct. 9, 2014

Related U.S. Application Data

(63) Continuation-in-part of application No. 12/351,391, filed on Jan. 9, 2009, now abandoned.

(51) Int. Cl.

| | |
|---|---|
| *C10C 1/00* | (2006.01) |
| *C10C 1/20* | (2006.01) |
| *C10G 67/06* | (2006.01) |
| *B01D 15/08* | (2006.01) |
| *B01J 20/283* | (2006.01) |
| *C10G 25/00* | (2006.01) |
| *C10B 57/04* | (2006.01) |
| *B01J 20/10* | (2006.01) |
| *B01J 20/34* | (2006.01) |
| *C10B 55/00* | (2006.01) |

(52) U.S. Cl.
CPC ............... *B01D 15/08* (2013.01); *B01J 20/103* (2013.01); *B01J 20/283* (2013.01); *B01J 20/3433* (2013.01); *B01J 20/3475* (2013.01); *C10B 57/045* (2013.01); *C10G 25/003* (2013.01); *C10G 67/06* (2013.01); *C10B 55/00* (2013.01)

(58) Field of Classification Search
CPC ............ C10C 1/00; C10C 1/20; C10C 1/205; C10G 67/06
See application file for complete search history.

(56) References Cited

U.S. PATENT DOCUMENTS

| | | | |
|---|---|---|---|
| 2,925,381 A * | 2/1960 | Fleck et al. ................ 208/254 R |
| 3,623,973 A * | 11/1971 | Tarhan ............................ 208/60 |
| 4,075,084 A * | 2/1978 | Skripek et al. .................. 208/93 |
| 4,178,229 A | 12/1979 | McConaghy et al. |
| 4,502,944 A | 3/1985 | Nelson |
| 4,894,144 A | 1/1990 | Newman et al. |
| 5,286,371 A | 2/1994 | Goval et al. |
| 5,900,189 A * | 5/1999 | Kawano et al. ............... 252/502 |
| 6,332,975 B1 | 12/2001 | Abdel-Halim et al. |
| 8,007,658 B2 * | 8/2011 | Miller et al. .................... 208/44 |
| 2008/0149533 A1 | 6/2008 | Yoo |

FOREIGN PATENT DOCUMENTS

CA     1219631     3/1987

OTHER PUBLICATIONS

I. Mochida et al., Removal of Basic Nitrogen Species in Coal—Tar Pitch by Metal Sulphates Supported on Silica Gel, 70 Fuel 761-764 (1991).*

PTQ Q2 2010: www.eptq.com; 15-18; "Anode-grade coke from traditional crudes"; A combination of solvent deashalting and delayed coking is an option to minimise fuel oil production and produce anode-grade coke; mitra Motaghi, Kanu Shree and Sujatha Krishnamurthy, KBR Technology.

Oliveira, Eniz Conceicao, et al, "Ion-exchange resins in the isolation of nitrogen compounds of nitrogen compounds from petroleum residues", Jornal of Chromatography A, 2004, 171-177, 1027, Chemistry Institute, Univ. of Federal do Rio Grande do Sul, Av. Bento Goncalves 9500, Bloco A, Porto Alegra (RS), Brazil.

Motaghi, Mitra; Shree, Kanu and Krishnamurthy Sujatha; "A combination of solvent deasphalting and delayed coking is an option to minimise fuel oil production and produce anode-grade coke.", 2010, 15-18, Q2, KBR Technology, PTQ, www.eptq.com.

Escallon, Maria M.; Fonseca, Dania A.; Schobert, Harold H.; "Characterization of Hydrotreated Decant Oils. Effect of Different severities of Hydrotreating on decant Oil Chemical Composition." EMS Energy Institute, The Pennsylvania State University, University park, Pennsylvania, 16802, United States, energy&fuels, pubs.acs.org/EF.

* cited by examiner

*Primary Examiner* — Randy Boyer
(74) *Attorney, Agent, or Firm* — Phillips 66 Company

(57) ABSTRACT

Methods relating to methods for producing a needle coke precursor from slurry oil having low levels of nitrogen and sulfur. Nitrogen-containing compounds are removed by chromatography, followed by hydrotreating at relatively mild conditions that focus on the more easily-removed sulfur-containing compounds while largely preserving aromatic content of the slurry oil. The resulting needle coke precursor can be converted to a premium needle coke in a delayed coking system.

17 Claims, 2 Drawing Sheets

SLURRY OIL UPGRADING WHILE PRESERVING AROMATIC CONTENT

CROSS-REFERENCE TO RELATED APPLICATIONS

This application is a continuation-in-part application that claims benefit under 35 USC §120 to U.S. application Ser. No. 12/351,391 filed Jan. 9, 2009, titled "Upgrading Slurry Oil Using Chromatographic Reactor Systems".

STATEMENT REGARDING FEDERALLY SPONSORED RESEARCH OR DEVELOPMENT

None

FIELD OF THE INVENTION

Embodiments of the invention relate to methods for processing slurry oil mixtures to produce a material suitable as feedstock for making premium needle coke.

BACKGROUND OF THE INVENTION

Needle coke is utilized to make graphite electrodes that are heated to high temperatures in steel production. Feedstocks historically utilized for needle coke production include coal-tar pitch, fluidized catalytic cracker decant oil (also known as slurry oil), petroleum vacuum residues, and ethylene tar pitches and solvent-refined coals.

The molecular composition of the coking feedstock utilized has a significant impact on the quality of needle coke subsequently produced. Greater aromatic content and lower sulfur and nitrogen content correspond to higher-quality, needle coke feedstock suitable for production of commercial electrodes.

Coal tar pitches have a high aromatic content exceeding 90 wt. % and a relatively high nitrogen content often exceeding 1 wt. %, but lower sulfur content of approximately 0.5 wt. % or less. As such, Mochida et al. showed that coal tar can be converted to a feedstock for the production of needle coke simply by removing nitrogen compounds by chromatography.

The use of slurry oil as a needle coke feedstock presents a greater challenge, as it typically contains relatively high levels of both sulfur and nitrogen compounds, while also having a lower aromatic content than coal tar pitch (approximately 70 to 80 wt. %). Conventional hydrotreating is typically used for removing both sulfur via hydrodesulfurization (HDS) and nitrogen via hydrodenitrogenation (HDN) from the slurry oil. However, we show herein that eliminating both sulfur and nitrogen compounds to a level suitable to produce a premium needle coke feedstock requires severe hydrotreating conditions that also causes a significant loss of aromatic content that significantly decreases the yield of high-quality needle coke feedstock.

Thus, improved systems and methods are needed for producing needle coke feedstock from slurry oil that can reduce levels of both sulfur and nitrogen compounds in the slurry oil, while largely preserving aromatic content of the slurry oil to increase both the yield and quality of a needle coke precursor that can be converted to premium needle coke product in a delayed coking apparatus.

SUMMARY OF THE INVENTION

In certain embodiments, a method of producing needle coke from a slurry oil includes the steps of: providing a slurry oil comprising aromatic compounds, nitrogen containing compounds and sulfur-containing compounds; contacting the slurry oil with a chromatography substrate that retains at least a portion of the nitrogen-containing compounds, thereby producing an upgraded slurry oil; hydrotreating the upgraded slurry oil with a hydrodesulfurization catalyst to remove sulfur-containing compounds from the upgraded slurry oil, thereby producing a needle coke precursor comprising less than about 0.5 percent (by weight) sulfur-containing compounds, where the hydrotreating is performed at a temperature that preserves at least 70 percent of the aromatic compounds comprising at least three aromatic rings that were originally present in the slurry oil feedstock; and, converting the needle coke precursor to needle coke into a coking system.

In certain embodiments, the hydrodesulfurization generates hydrogen sulfide from sulfur-containing compounds in the upgraded slurry oil and strips the hydrogen sulfide from the upgraded slurry oil.

In certain embodiments, the slurry oil comprises at least 70 percent (by weight) aromatic compounds that, in turn, comprise from three to six aromatic rings.

In certain embodiments, the hydrotreating is performed at a temperature that preserves at least 80 percent, optionally 90 percent, of the aromatic compounds comprising at least three aromatic rings that were originally present in the slurry oil.

In certain embodiments, the chromatography substrate is contained with a chromatography reactor and the slurry oil is passed through the chromatography reactor the decrease the level of nitrogen-containing compounds to a threshold level of 0.75 wt. percent or less, optionally 0.5 wt. percent or less, 0.2 wt. percent or less, 0.1 wt. percent or less, or even 500 ppmw or less. In certain embodiments, the slurry oil mixture is passed through the chromatography reactor multiple times to decrease the level of nitrogen-containing compounds in the slurry oil to below the threshold level.

In certain embodiments, the chromatography substrate is contained within multiple chromatography reactors in a swing configuration, wherein the slurry oil mixture is passed through at least one chromatography reactor while one or more additional chromatography reactors are regenerated.

In certain embodiments, decreasing the level of nitrogen-containing compounds to the threshold level or below enables the hydrotreating to occur at a less severe conditions of temperature, pressure, or both to remove sulfur-containing compounds to below 0.5 wt. percent, wherein the less severe conditions cause the preservation of at least 70 wt. percent, optionally 80 wt. percent, optionally 90 wt. percent of aromatic compounds comprising at least three aromatic rings that were originally present in the slurry oil.

In certain embodiments, decreasing the level of nitrogen-containing compounds to below the threshold level causes increased activity of the hydrotreating catalyst, thereby lowering the temperature or pressure required during hydrotreating to remove sulfur-containing compounds from the slurry oil to a level below about 0.5 wt. percent.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Figure 1:
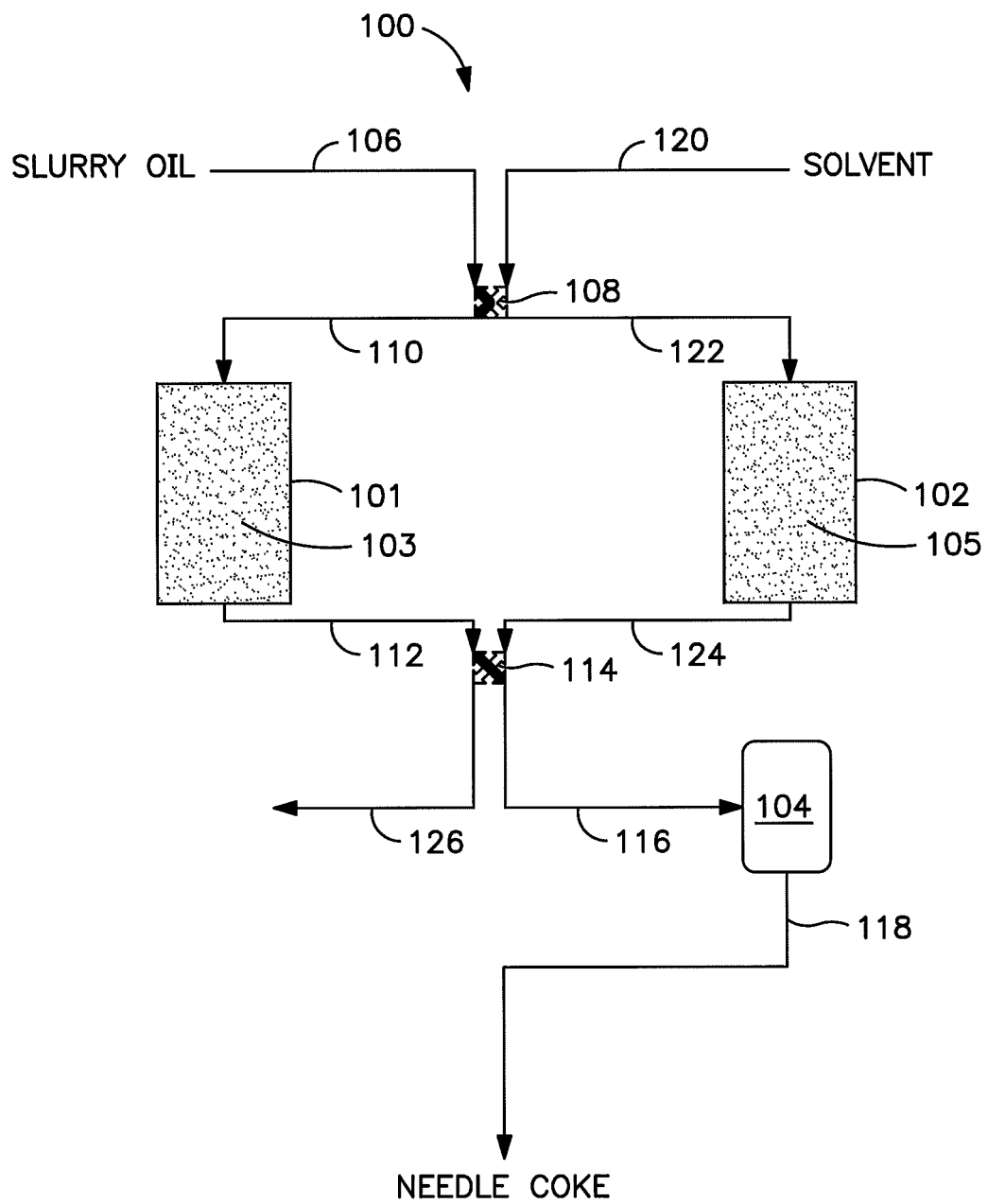
FIG. 1 is a schematic diagram of a system that is for processing slurry oil to produce needle coke and that includes regenerative-chromatographic reactors, according to one embodiment.

The increased sulfur and decreased aromatic content of slurry oil derived from a fluidized catalytic cracker (also known as FCC decant oil) make it more challenging to convert to a premium needle coke feedstock than other substances, (e.g., coal tar). The methods presented herein allow increased quality and yield of needle coke feedstock derived from slurry oil.

A premium feedstock for producing needle coke typically contains no more than 0.5 wt % of sulfur compounds and nitrogen levels of about 50-100 ppmw. However, slurry oil typically contains approximately 0.4 wt. % nitrogen, approximately 1.1 wt. % sulfur, and a lower percentage of aromatic compounds (approximately 70-80 wt. %) than other substances utilized as needle coke feedstock (e.g., coal tar). Conventional hydrotreating methodology is typically used to remove sulfur-containing compounds (via HDS) and nitrogen-containing compounds (via HDN) from slurry oil. Unfortunately, removing nitrogen-containing compounds via HDN requires more severe hydrotreating conditions than removing sulfur-containing compounds via HDS, and we have found that increasing the severity of hydrotreating to ensure removal of nitrogen to a level sufficient for producing a needle coke feedstock concurrently caused excessive losses of aromatic compounds via hydrogenation of the aromatic rings.

Table 1 clearly shows this effect. We contacted a slurry oil feedstock with a conventional CoMo hydrotreating catalyst at the temperatures and pressures indicated, and determined the resulting content of sulfur, nitrogen and aromatics. Aromatics containing three or more aromatic rings are considered most important for determining the quality of a coking feedstock, and relative content in both the slurry oil feedstock and the hydrotreated samples was determined. Increasing the hydrotreating temperature from 610° F. to 640° F. reduced the levels of N-compounds by an additional 10.6%, but decreased the 3+ ring aromatic content by an additional 12.6%, the 4-ring aromatics content by an additional 17.9%, and the 5-ring aromatics by an additional 15.3%. These results demonstrate that conventional hydrotreating of slurry oil is an inefficient methodology for producing a coking feedstock suitable for making premium needle coke.

TABLE 1

The Effect of Hydrotreating Temperature on the Removal of Sulfur, Nitrogen and Aromatics from Slurry Oil

|  | Slurry Feedstock Properties | Case 1 | Case 2 |
|---|---|---|---|
| Process Conditions |  |  |  |
| Pressure (psig) |  | 1000 | 1000 |
| Temperature |  | 610° F. (321° C.) | 640° F. (338° C.) |
| LHSV (h$^{-1}$) |  | 1 | 1 |
| Molecular Properties |  |  |  |
| Sulfur (wt. %) | 1.21 | 0.44 | 0.28 |
| Nitrogen (ppmw) | 1630 | 1360 | 1190 |
| 3 Ring aromatics (wt. %) | 46.0 | 39.8 | 34.9 |
| 4 Ring aromatics (wt. %) | 16.8 | 8.8 | 5.8 |
| 5 Ring aromatics (wt. %) | 1.3 | 0.3 | 0.1 |
| 3+ Ring aromatics (wt. %) | 64.1 | 48.9 | 40.8 |

Certain embodiments of the present invention relate to decreasing the content of nitrogen-containing compounds and sulfur-containing compounds within a slurry oil without significantly affecting aromatic content. The slurry oil is first contacted with, or passed through, a chromatography media that may be enclosed within a chromatographic-based assembly, where the contacting remove at least a portion of the nitrogen-containing compounds and produces a upgraded slurry oil that is contacted with a hydrotreating catalyst to produce a premium feedstock for making needle coke in a delayed coking apparatus.

Removing at least a portion of the nitrogen-containing compounds in the slurry oil prior to hydrotreating allows the hydrotreating to be tailored specifically for the removal of sulfur alone, which requires less severe conditions relative to hydrotreating to simultaneously remove both nitrogen-containing and sulfur-containing compounds. These less severe conditions effectively allow preservation of aromatic content in the slurry oil. Once most nitrogen-containing compounds (and in certain embodiments, some sulfur-containing compounds as well) have been removed from the slurry oil via chromatography, mild hydrotreating can be performed until enough sulfur-containing compounds have been removed (optimally, about 0.5 wt % or less) to produce an upgraded slurry oil that is a premium needle coke precursor. In certain embodiments, the process preserves, at least 70 wt. %, at least 80 wt. %, or at least 90 wt. % of the aromatic compounds present in the original slurry oil.

As used herein, slurry oil (or decant oil) refers to a hydrocarbon mixture derived from a fluidized catalytic cracker having an API gravity of less than 10°. The slurry oil includes various hydrocarbons including poly-cyclic aromatic rings. As discussed above, the slurry oil also typically contains nitrogen, sulfur and other metals, such as copper, iron, nickel, zinc, and vanadium.

FIG. 1 shows a system 100 for processing slurry oil to produce needle coke. The system 100 includes a chromatographic first reactor 101, a chromatographic second reactor 102, and a coking system 104. The first and second reactors 101, 102 each respectively contain first and second adsorbent packing material 103, 105. As explained herein, the first and second adsorbent packing material 103, 105 can be the same material.

A slurry oil supply conduit 106 contains the slurry oil that may be produced in a refinery. The supply conduit 106 couples to a flow control device such as a first valve 108 operable to divert flow from the supply conduit 106 to either the first reactor 101 or the second reactor 102 based on an operational state of the system 100. Selective operation of the first valve 108 as shown illustrates the system 100 in a first reactor online state with the second reactor 102 being regenerated.

While only one of the reactors 101, 102 is needed in some embodiments for batch processing of the slurry oil, the system 100 may utilize the first and second reactors 101, 102 in a swing arrangement as described further herein. This operation of the first and second reactors 101, 102 within the system 100 both accommodates continuous intake of the slurry oil from the supply conduit 106 without need for slurry oil storage tanks and provides, without need for additional storage tanks, continuous output to the coking system 104 to avoid interrupting coking operations. For some embodiments, the system 100 may include further chromatographic reactors in addition to the first and second reactors 101, 102 for greater throughput, to ensure sufficient time for regeneration, or for ability to maintenance any one reactor while still being able to switch among a remaining two or more reactors.

In the first reactor online state, the slurry oil delivered from the refinery via the supply conduit 106 passes through the first valve 108 to a first reactor inlet 110. The first reactor inlet 110 introduces the slurry oil into an interior volume of the first reactor 101. A flow path of the slurry oil through the first reactor 101 extends between the first reactor inlet 110 and a first reactor outlet 112. Since the first packing material 103 is disposed in the flow path, the slurry oil contacts the first packing material 103 within the first reactor 101.

The first packing material 103 retains polar compounds such as nitrogen-containing compounds and sulfur-containing compounds. The nitrogen-containing compounds and the and sulfur-containing compounds within the slurry oil adsorb onto the first packing material 103 while hydrocarbons that are non-polar pass through the first reactor 101. The first reactor 101 thereby functions to remove the nitrogen-containing compounds from the slurry oil. For some embodiments, solid particles of a polar compound form the first packing material 103 and may have a spherical shape. Examples of the first packing material 103 include silica (100% $SiO_2$) and modified forms of silica, such as, for example, silica gel or silica modified with a metal (e.g., aluminum), a metal oxide (e.g., alumina, titania), an acid (e.g., hydrochloric acid), a base (e.g., potassium hydroxide), or an organic compound (e.g., octadecylsilyl). Other packing materials not specifically mentioned herein, but conventionally known to adsorb nitrogen compounds may also be utilized. While described with reference to the first packing material 103, the second packing material 105 and the first packing material 103 may be alike.

Even though not all the nitrogen-containing compounds and the sulfur-containing compounds may be removed from the slurry oil upon the slurry oil passing through the first reactor 101, the first reactor 101 upgrades the slurry oil such that weight percent of the nitrogen-containing compounds in the slurry oil at the first reactor outlet 112 is reduced relative to weight percent of the nitrogen-containing compounds in the slurry oil at the first reactor inlet 110. For some embodiments, the first reactor 101 may provide at least a 20% reduction of the nitrogen-containing compounds in the slurry oil. Measuring nitrogen content of the slurry oil before and after the slurry oil passes through the first reactor 101 enables determining amount of the reduction. Further, set thresholds (e.g., less than 25%) for this amount of reduction or a specified time interval may trigger switching from the first reactor online state to a second reactor online state. In the second reactor online state (see, FIG. 2), the first valve 108 directs the slurry oil from the supply conduit 106 to the second reactor 102 while the first reactor 101 is regenerated.

While still in the first reactor online state, another flow control device such as a second valve 114 directs flow of the slurry oil from the first reactor outlet 112 to a feedstock supply 116 for the coking system 104. For some embodiments, the coking system 104 may include conventional components, such as furnaces and drums, for performing coking operations. The coking operation produces the needle coke output from the coking system 104, as indicated by needle coke transport route 118. Preparing of graphite electrodes suitable for use in metallurgical industries further occurs in some embodiments upon making the needle coke in the coking system 104.

As an example of the coking operation performed by the coking system 104, a coking furnace heats the slurry oil from the feedstock supply 116 prior to the slurry oil being introduced into a coke drum. During the coking operation, the slurry oil thermally decomposes into vapor products and solid needle coke that is left behind in the coke drum. The coking processes may function in a swing manner such that while one coke drum is being filled another one is being purged of the vapors, cooled, opened for removal of the solid needle coke, and readied for refilling.

With respect to aforementioned regeneration of the second reactor 102, the first valve 108 directs a polar solvent within a solvent conduit 120 to a second reactor inlet 122. Exemplary solvents include polar protic solvents, such as methanol, ethanol, n-propanol or iso-propanol, or polar aprotic solvents, such as acetone, acetonitrile, di-methyl formamide (DMF) or di-methyl sulfoxide (DMSO). The solvent contacts the second packing material 105 (and/or the first packing material 103 if regenerating the first reactor 101) and desorbs the nitrogen-containing compounds adsorbed from the slurry oil passing through the second reactor 102 during operation of the system 100 in the second reactor online state. Then, the solvent exits the second reactor 102 via a second reactor outlet 124. The second valve 114 directs flow of the solvent from the second reactor outlet 124 to a solvent waste stream 126, while the system is in the first reactor online state. Once the nitrogen-containing compounds are desorbed using the solvent and flushed from the second reactor 102, the second packing material 105 is regenerated such that the second packing material 105 is again able to adsorb the nitrogen-containing compounds in the slurry oil when the system 100 is switched back to the second reactor online state.

Volumes of the first and second reactors 101, 102 may depend on desired residence time of the slurry oil given a particular flow rate of the slurry oil. Longer residence times may facilitate greater adsorption and removal of the nitrogen-containing compounds. In some embodiments, the first and second reactors 101, 102 may operate under different conditions at different times. For example, temperature within the first and second reactors 101, 102 may be at ambient temperature (e.g., between 15° C. and 30° C.) when adsorbing the nitrogen-containing compounds from the slurry oil and may be increased (e.g., at least 10° C. higher relative to when adsorbing) to facilitate desorption when desorbing the nitrogen-containing compounds using the solvent. For some embodiments, pressures within the first and second reactors 101, 102 may be between 0 pounds per square inch gauge (psig) and 200 psig.

Actuation of the first and second valves 108, 114 switches the system 100 between the first reactor online state and the second reactor online state. The swing arrangement cycles to alternate between the states during operation. This cycling alternates between placing the first reactor 101 in fluid communication with the slurry oil and coking system 104 and placing the first reactor 101 in fluid communication with the solvent and the solvent waste stream 126. Likewise, the cycling alternates between placing the second reactor 102 in fluid communication with the slurry oil and coking system 104 and placing the second reactor 102 in fluid communication with the solvent and the solvent waste stream 126. Further, placing the second reactor 102 in fluid communication with the slurry oil and coking system 104 may occur at different times than placing the first reactor 101 in fluid communication with the slurry oil and coking system 104. While respective flow paths change between the states, operational details of the second reactor online state correspond with operational details of the first reactor online state to provide continuous upgrading of the slurry oil used as precursor for the needle coke.

Figure 2:
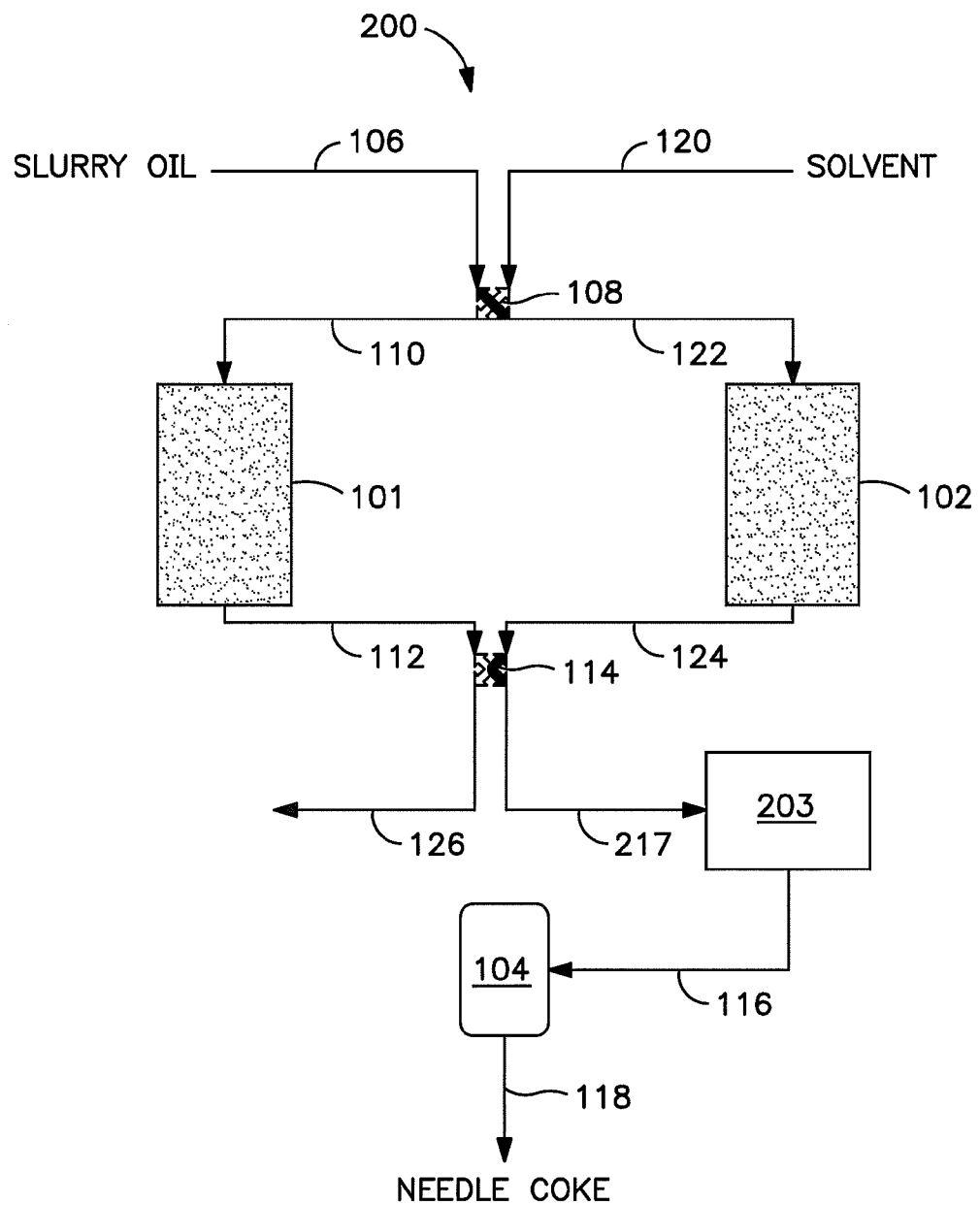
FIG. 2 is a schematic diagram of another system that is for processing slurry oil to produce needle coke and that includes a regenerative-chromatographic based assembly coupled with a hydrotreater, according to one embodiment.

FIG. 2 illustrates a serial staged system 200 for processing slurry oil to produce needle coke. The system 200 includes various analogous components and features shown in FIG. 1 and identified by common reference numbers. Any aspects set forth herein for an element identified by a given reference number apply to corresponding elements having the common reference number. The system 200 includes a chromatographic based assembly (e.g., the chromatographic first reactor 101 and the chromatographic second reactor 102) coupled in series with a hydrotreater 203 in order to remove nitrogen-containing compounds and sulfur-containing compounds from the slurry oil prior to feeding the slurry oil to the coking system 104.

By contrast to FIG. 1 showing the first reactor online state, FIG. 2 depicts the first and second valves 108, 114 operated to place the system 200 in the second reactor online state. In the second reactor online state, the second reactor 102 is in fluid communication with slurry oil and the coking system 104 via the supply conduit 106, the second reactor inlet 122, the second reactor outlet 124, a hydrotreater inlet 217, the hydrotreater 203 and the feedstock supply 116. Further, regeneration of the first reactor 101 occurs during the second reactor online state by the first reactor 101 being in fluid communication with the solvent and the solvent waste stream 126 via the solvent conduit 120, the first reactor inlet 110, and the first reactor outlet 112.

The hydrotreater 203 further removes sulfur from the slurry oil through hydro-desulfurization (HDS). Unlike the first and second reactors 101, 102 that provide separation without chemical reaction of the slurry oil, the hydrotreater 203 relies on catalyzed hydrogenation chemical reactions of the slurry oil to hydrogenate the sulfur-containing compounds within the slurry oil. A hydrogen-containing gas within the hydrotreater 203 supplies hydrogen for the chemical reaction. The HDS converts the sulfur-containing compounds within the slurry oil into organic products and hydrogen sulfide, which can be stripped from the slurry oil that includes the organic products and is less volatile than the hydrogen sulfide. The catalyst selected for use in the hydrotreater 203 can be sulfur-specific since the first and second reactors 101, 102 reduce content of the nitrogen-containing compounds in the slurry oil independent of any hydrotreating of the slurry oil. For some embodiments, the hydrotreater 203 may include catalyst formed of small clusters of molybdenum disulfide with cobalt or nickel additives that serve to promote the chemical reaction.

The nitrogen-containing compounds in the slurry oil tend to inhibit sulfur removal during the HDS. Performing the HDS after passing the slurry oil through one of the first and second reactors 101, 102 can thus benefit from removal of some of the nitrogen-containing compounds in the slurry oil. Use of the first and second reactors 101, 102 for chromatography ahead of the hydrotreater 203 thereby enables operation of the hydrotreater 203 without heating to as high of temperatures compared to temperatures needed for the HDS without the removal of any of the nitrogen-containing compounds in the slurry oil. The slurry oil may be maintained at low enough pressures and temperatures within the hydrotreater 203 to limit or prevent saturation of aromatics in the slurry oil. In certain embodiments, hydrotreater 203 be maintained at a temperature of from 200° C. to 350° C., optionally from 200° C. to 290° C., 250° C. to 290° C., less than 375° C., less than 350° C., less than 325° C., less than 310°, less than 300° C., less than 290° C., less than 280° C., less than 270° C., or even less than 260° C. Embodiments where a portion of the sulfur compounds are removed by chromatography may allow hydrotreating at lower temperatures while still resulting in removal of sulfur compounds to a level of less than about 0.5 wt. %. In certain embodiments, the pressure utilized in the hydrotreater may range from 1 to 2000 psig, optionally 1000-2000 psig, 500-1500 psig, 1-350 psig, 390-510 psig, or 550-750 psig.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. Thus, the invention disclosed herein is specifically intended to be as broad as the claims below and those variations and equivalents that are encompassed by the scope of the claims. The abstract and drawings are not intended to limit the scope of the invention.

REFERENCES

The references cited herein are expressly incorporated by reference. The discussion of any reference is not an admission that it is prior art to the present invention, especially any reference that may have a publication data after the priority date of this application. Incorporated references are listed again here for convenience:

Mochida, I. et al., "Removal of Basic Nitrogen Species in Coal Tar Pitch by Metal Sulphates Supported on Silica Gel" Fuel 70:761-764 (1991).

Motaghi, et al. "Anode Grade Coke from Traditional Crudes" Petroleum Technology Quarterly, $2^{nd}$ quarter 2010, pg. 15.

The invention claimed is:

1. A process for producing needle coke from slurry oil, comprising:
   a) providing a slurry oil comprising aromatic compounds, nitrogen containing compounds and sulfur-containing compounds;
   b) contacting the slurry oil with a chromatography substrate that retains at least a portion of the nitrogen-containing compounds, thereby producing an upgraded slurry oil;
   c) hydrotreating the upgraded slurry oil at a pressure in the range from 1 to 350 psig with a hydrodesulfurization catalyst to remove sulfur-containing compounds from the upgraded slurry oil, thereby producing a needle coke precursor comprising less than about 0.5 percent (by weight) sulfur-containing compounds, wherein the hydrotreating is performed at a temperature that preserves at least 70 percent of the aromatic compounds comprising at least three aromatic rings that were originally present in the slurry oil feedstock;
   d) converting the needle coke precursor to needle coke in a coking system.

2. The method according to claim 1, wherein the hydrodesulfurization generates hydrogen sulfide from sulfur-containing compounds in the upgraded slurry oil and strips the hydrogen sulfide from the upgraded slurry oil.

3. The method according to claim 1, wherein the slurry oil comprises at least 70 percent (by weight) aromatic compounds that, in turn, comprise from three to six aromatic rings.

4. The method according to claim 1, wherein the hydrotreating is performed at a temperature that preserves at least 80 percent of the aromatic compounds comprising at least three aromatic rings that were originally present in the slurry oil.

5. The method according to claim 1, wherein the hydrotreating is performed at a temperature that preserves at least 90 percent of the aromatic compounds comprising at least three aromatic rings that were originally present in the slurry oil.

6. The method according to claim 1, wherein the nitrogen-containing compounds within the slurry oil are adsorbed onto the chromatography substrate.

7. The method according to claim 1, wherein the chromatography substrate is contained within a chromatography reactor and the slurry oil is passed through the chromatography reactor to decrease the level of nitrogen-containing compounds to a threshold level of 0.75 wt. percent or less.

8. The method according to claim 7, wherein the slurry oil mixture is passed through the chromatography reactor multiple times to decrease the level of nitrogen-containing compounds in the slurry oil to below the threshold level.

9. The method of claim 7, wherein the threshold level is 0.5 wt. percent or less.

10. The method of claim 7, wherein the threshold level is 0.2 wt. percent or less.

11. The method of claim 7, wherein the threshold level is 0.1 wt. percent or less.

12. The method of claim 7, wherein the threshold level is 500 ppmw or less.

13. The method according to claim 1, wherein the chromatography substrate is contained within multiple chromatography reactors in a swing configuration, wherein the slurry oil mixture is passed through at least one chromatography reactor while one or more additional chromatography reactors are regenerated.

14. The method according to claim 7, wherein decreasing the level of nitrogen-containing compounds to the threshold level or below enables the hydrotreating to occur at less severe conditions of temperature, pressure, or both to remove sulfur-containing compounds to below 0.5 wt. percent, wherein the less severe conditions cause the preservation of at least 70 wt. percent of aromatic compounds comprising at least three aromatic rings that were originally present in the slurry oil.

15. The method according to claim 14, wherein the less severe conditions cause the preservation of at least 80 wt. percent of aromatic compounds comprising at least three aromatic rings that were originally present in the slurry oil.

16. The method according to claim 14, wherein the less severe conditions cause the preservation of at least 90 wt. percent of aromatic compounds comprising at least three aromatic rings that were originally present in the slurry oil.

17. The method according to claim 7, wherein decreasing the level of nitrogen-containing compounds to below the threshold level causes increased activity of the hydrotreating catalyst, thereby lowering the temperature or pressure required during hydrotreating to remove sulfur-containing compounds from the slurry oil to a level below about 0.5 wt. percent.

* * * * *